United States Patent

[11] 3,582,158

| [72] | Inventor | Edwin J. Hammon |
| | | Cuyahoga, Ohio |
| [21] | Appl. No. | 777,597 |
| [22] | Filed | Nov. 21, 1968 |
| [45] | Patented | June 1, 1971 |
| [73] | Assignee | Lempco Industries, Inc. |
| | | Cleveland, Ohio |

[54] DIE SET HAVING READILY REPLACEABLE GUIDE PINS AND BUSHINGS
3 Claims, 8 Drawing Figs.

[52] U.S. Cl. ......................................... 308/4C,
287/20.3
[51] Int. Cl. ....................................... F16c 1/26,
F16c 17/00
[50] Field of Search ........................... 308/4, 237,
4 C, 6 B; 287/20.3, 105, 52, 53; 151/41.73

[56] References Cited
UNITED STATES PATENTS

| 2,883,012 | 4/1959 | Hoffman | 151/41.73X |
| 2,812,962 | 11/1957 | Parkes | 287/53 |
| 2,974,984 | 3/1961 | Koch | 287/53 |
| 3,275,944 | 9/1966 | Hammon | 308/4 |
| 3,290,070 | 12/1966 | Janiszewski | 287/20.3 |

*Primary Examiner*—Manuel A. Antonakas
*Attorneys*—Mahoney, Miller and Rambo and William S. Rambo ABSTRACT: A die set having relatively reciprocal plates or shoes and relatively telescoping guide pins and bushings for maintaining alignment of said plates during reciprocation thereof, and wherein said guide pins and/or bushings are connected with the plates in a manner to permit ready replacement thereof.

PATENTED JUN 1 1971
3,582,158
SHEET 1 OF 2
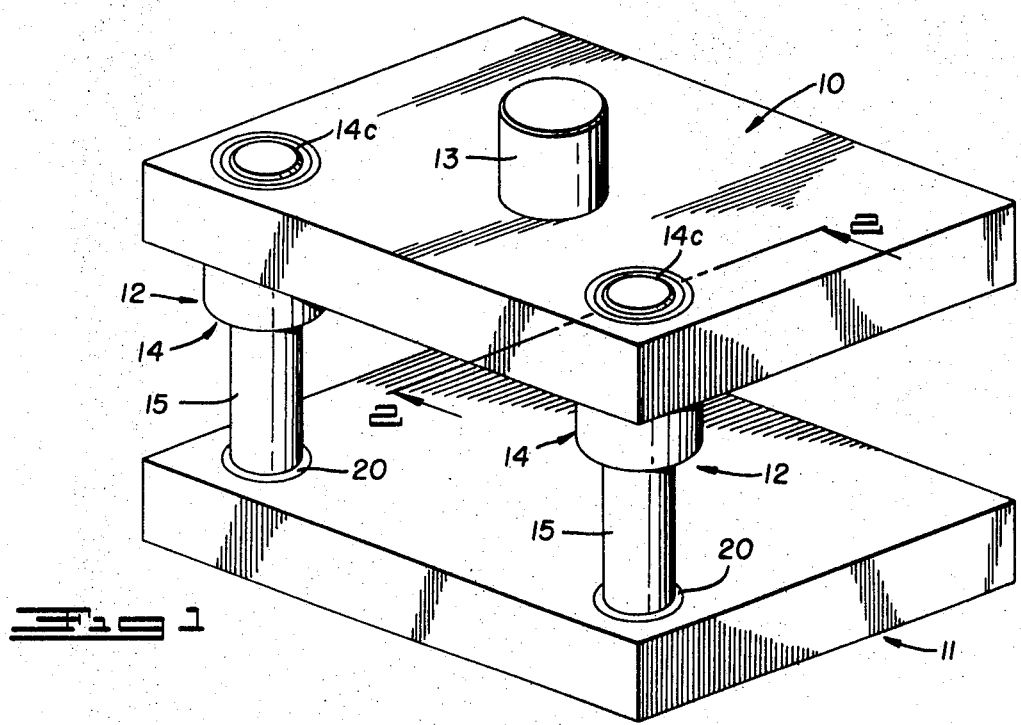
Fig 1
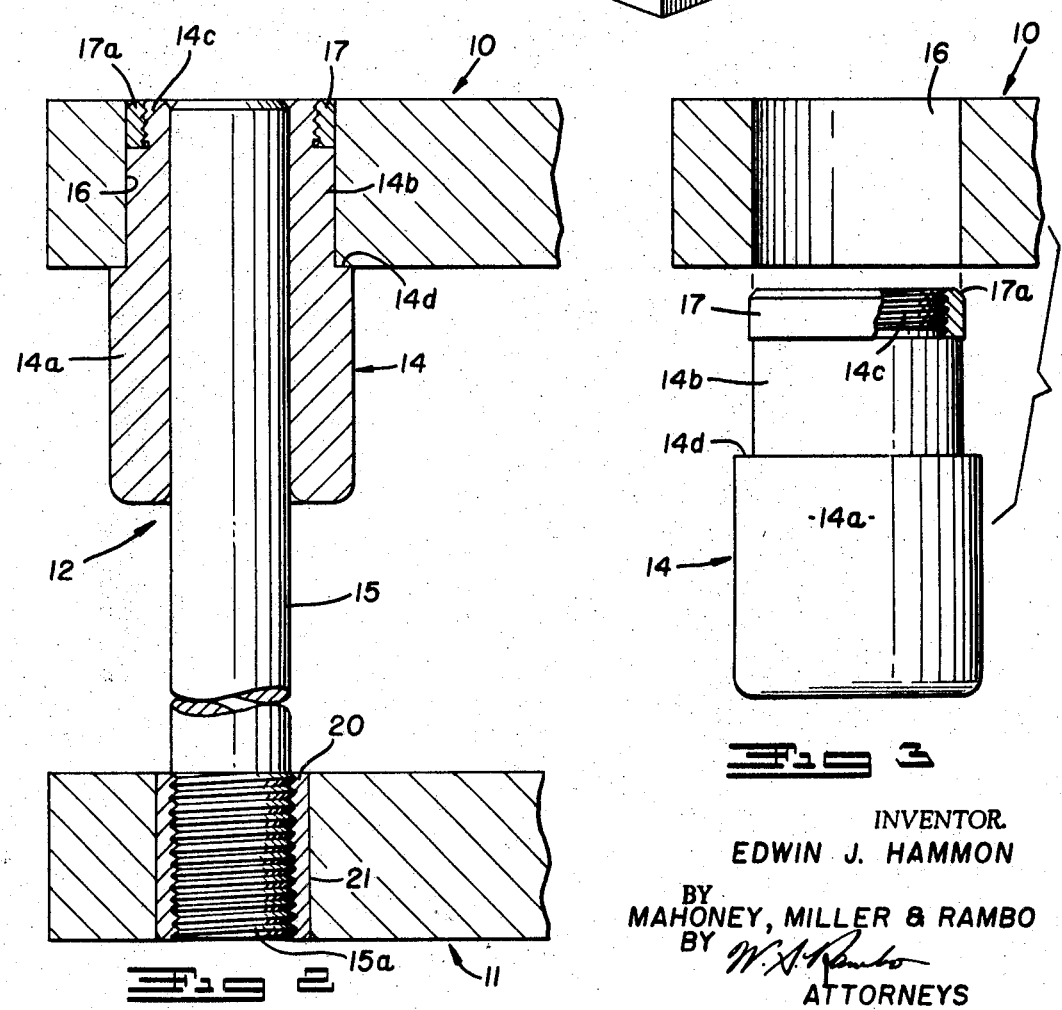
Fig 2
Fig 3
INVENTOR.
EDWIN J. HAMMON
BY
MAHONEY, MILLER & RAMBO
BY
W.S.Rambo
ATTORNEYS

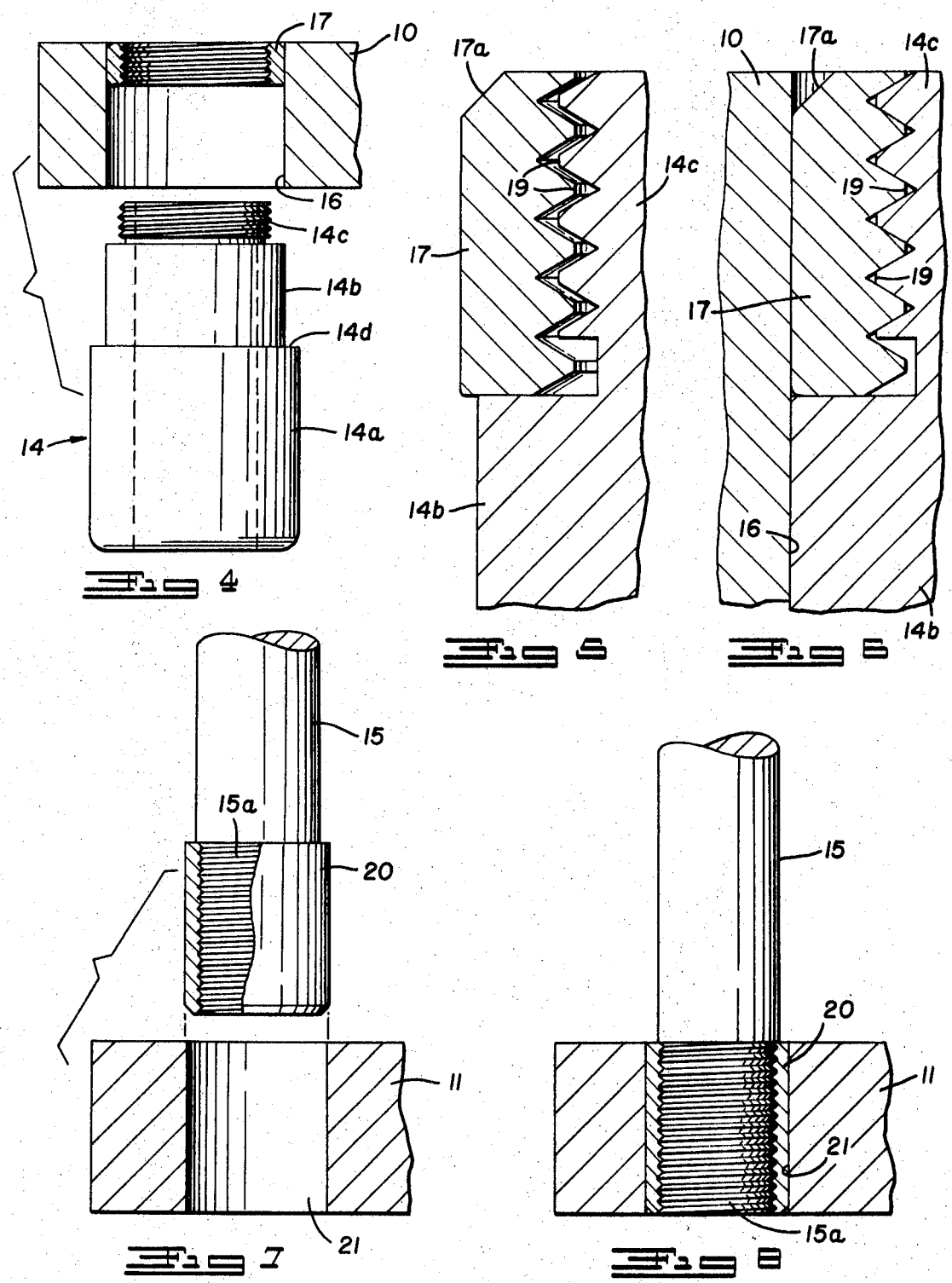

DIE SET HAVING READILY REPLACEABLE GUIDE PINS AND BUSHINGS

BACKGROUND OF THE INVENTION

The present invention relates generally to die or mold sets for presses, and more specifically to die sets of the type having demountable guide pins and/or bushings (C1. 308-4).

In the past, it has been common practice in the manufacture of die sets to mount the guide pins and/or bushings by press-fitting an end portion of the pin or bushing into a precision machined bore or socket formed in an associated die-supporting shoe or plate to thereby securely fasten such pin or bushing to its associated plate. However, as is readily apparent to those familiar with the art, when a tubular bushing is press-fitted or interference-fitted into a bore or socket, the inner diameter of the bushing partially collapses, or decreases to an extent that the bore of the bushing must be remachined and refinished aft the press-fitting in order to restore its inner diameter to proper size and finish. Also, the press or interference fitting of a solid guide pin into a bore or socket of a shoe oftentimes distorts the walls of the pin and/or the socket in a manner to cause the pins to be cocked or tilted from a desired truly "square" position relative to the die-supporting shoe or plate.

In an effort to alleviate certain of the problems attendant to the press-fitting or interference-fitting of guide pins and bushings to the die-supporting plates or shoes of a die set, it has been proposed to detachably connect such pins or bushings to their plates by means of clamps, bolts or screws. However, such detachable fastening means, by and large, are objectionable in that they are comparatively costly to manufacture and assemble and oftentimes fail to hold and maintain the pins and/or bushings in the exacting alignment required for high speed press operations.

SUMMARY AND OBJECTS OF THE INVENTION

The present invention provides a die set in which the guide pin and/or bushing members are threadedly and detachably secured to their associated die-supporting plates or shoes by means of threaded insert sleeves, collars, or nuts which are initially machined and finished apart from the plates or shoes and thereafter permanently press-fitted into bores or sockets formed in the plates or shoes.

The primary object of this invention is to provide a die set having readily detachable and replaceable guide pins and bushings which is constructed so as to insure the desired rigidity of connection of the guide pins and bushings to their associated plates and the desired degree of accuracy of alignment of such pins and bushings relative to each other and to their plates.

BRIEF DESCRIPTION DRAWINGS

In the accompanying drawings:

FIG. 1 is a perspective view of a die set according to the present invention;

FIG. 2 is an enlarged, fragmentary vertical sectional view taken through one of the guide pins and bushing assemblies of the die set along a plane indicated by the line 2–2 of FIG. 1;

FIG. 3 is an exploded side elevational view, partially in vertical section, of a guide bushing and its mounting sleeve prior to the press-fitting of the mounting sleeve into the socket of the plate;

FIG. 4 is a similar view, but showing the mounting sleeve in its press-fitted position in the socket of the plate with the guide bushing detached therefrom;

FIG. 5 is an enlarged, fragmentary vertical sectional view taken through the guide bushing and its mounting sleeve prior to press-fitting of the sleeve into the socket of the plate and showing particularly the tolerance between the threads of the bushing and sleeve prior to press-fitting the sleeve;

FIG. 6 is a similar view showing the close fitting arrangement of the threads of the bushing and sleeve after the sleeve is press-fitted into the socket of the plate;

FIG. 7 is an exploded vertical sectional view showing one of the guide pins and its associated mounting sleeve prior to press-fitting the sleeve into the socket of an associated plate; and FIG. 8 is a similar view showing the guide pin and mounting sleeve assembled in the socket of the plate.

DESCRIPTION OF PREFERRED EMBODIMENTS

A die set according to the present invention is illustrated in FIG. 1 as comprising upper and lower die-supporting plates or shoes 10 and 11, respectively, and a pair of guide pin and bushing assemblies 12. The upper shoe 10, as usual, is provided with an upstanding shank 13 for attachment or connection with the reciprocating ram or platen of a press, not shown. In operation, the shoes 10 and 11 are adapted to support on the opposed planar working surfaces or faces thereof a pair of relatively engageable dies, or a punch and die, not shown. The lower shoe 11 may be secured in any suitable manner to the stationary bed or bolster of the press, not shown, and the upper shoe 10 is reciprocated toward and away from the lower shoe 11 during the working strokes of the press. The pin and bushing assemblies 12 are adapted to maintain the shoes 10 and 11 and their associated die parts in exacting relative alignment during relative reciprocation of the shoes and die parts.

Each of the pin and bushing assemblies 12 comprises guide means in the form of a tubular bushing 14 and a relatively telescoping post or pin 15. According to this invention, the bushings 14, and preferably the pins 15, are detachably, or demountably, connected with the respective upper and lower shoes or plates 10 and 11 by means of internally threaded, metallic collars, sleeves, or nuts which are securely fixed within bores or sockets formed in the respective shoes or plates of the die set. Thus, each of the bushings 14 is formed with a relatively diametrically enlarged main body portion 14a which projects perpendicularly downwardly from the lower face of the upper plate 11, a reduced diameter shank portion 14b which is snugly, but rotatively, carried within the bore or socket 16 formed in the upper plate 11, and a relatively smaller diameter, externally screw-threaded end portion 14c arranged for threaded engagement with an internally threaded nut or sleeve 17. The relatively reduced diameter shank portion 14b of the bushing 14 forms with the main body portion 14a thereof a radial shoulder 14d which is arranged for flush, abutting engagement with the under face of upper shoe 10 in the area thereof adjacent the socket or bore 16.

As indicated particularly in FIGS. 3 and 5 of the drawings, the nut or sleeve 17 is initially formed with an outer diameter which is slightly oversize, or greater than the diameter of the socket or bore 16, to thus provide an interference fit between the sleeve 17 and the walls of the socket or bore 16. Preferably the relaxed outer diameter of the sleeve 17 is approximately 0.0001 to 0.0002 inch larger than the diameter of the bore 16 of the plate, and the sleeve 17 is preferably assembled in the bore 16 by first threading the sleeve onto the threaded end portion 14c of the bushing and then driving or press-fitting the sleeve into the bore 16 from the lower end thereof. To facilitate the press-fitting of the sleeve 17 onto the bore 16, the upper end of the sleeve is preferably chamfered or beveled, as at 17a. During the press-fitting of the sleeve in the bore of the plate, the reduced diameter shank portion 14b and the shoulder 14d of the bushing 14 serve to pilot the sleeve 17 to its desired location at the top of the bore 16 and prevent undesired cocking or tilting of the sleeve relative to the axis of the bore 16.

Also, as illustrated particularly in FIGS. 5 and 6, the threads of the sleeve 17 and of the bushing 14 are preferably formed with blunt or truncated crests 19, and may be the so-called acme-type of threads. Also, the threaded surfaces of the sleeve 17 and of the bushing 14 are sized so that a clearance or tolerance of from 0.0001 to 0.0002 inch is provided between such threads prior to the press-fitting of the sleeve into the bore 16. In this regard, it will be understood that when the sleeve 17 is press-fitted into the bore 16, it is compressed radially inwardly and the inner diameter of the sleeve will decrease proportionately. Thus, in order to prevent undesired seizure between the threads of the sleeve 17 and those of the bushing, a sufficient tolerance is initially provided between these members to compensate for the decrease in diameter of the sleeve due to the interference or press-fit of the sleeve in the bushing. At the same time, the designed tolerance between the threads of the sleeve and bushing is such that, following the press-fitting of the sleeve, the threads will be in close fitting, but rotative engagement to permit easy detachment of the bushing 14 from the press-fitted sleeve 17, as illustrated in FIG. 4. The comparative relationships of the threads of the bushing and sleeve prior to and after press-fitting of the sleeve is illustrated, respectively, in FIGS. 5 and 6.

As previously indicated, the guide posts or pins 15 are also preferably mounted for ready detachment from the lower shoe 11 of the die set. Toward this end, each of the pins 15 is formed or otherwise provided with an externally threaded lower end section 15a which is arranged for threaded engagement with an internally threaded collar, sleeve, or nut 20 which is press-fitted or otherwise disposed in interference fit relation within a bore or socket 21 formed in the lower shoe 11. The threads of the sleeve 20 and of the pin 15 are also preferably blunt or truncated in the same manner as the threads of the sleeve 17 and the bushing 14. Also, an initial tolerance or clearance is provided between the threads of the sleeve 20 and the lower end portion 15a of the pin 15 so as to permit the inner diameter of the sleeve 20 to contract or "shrink" when the sleeve is press-fitted into the bore 21 without causing seizure of the threads of the sleeve with those of the pin.

In view of the foregoing, it will be seen that the present invention provides an improved, yet mechanically simple, means for accurately, yet detachably, connecting the relatively telescoping guide pins and bushings to the relatively reciprocal shoes or plates of a die set. The relatively small, screw-threaded mounting nuts or sleeves 17 and 20 are comparatively much more simple to machine to the high degree of accuracy required than are the bores or sockets of the relatively large and heavy plates or shoes of the die set. Further, the screw-threaded connections between the mounting sleeves and the guide pins and/or bushings greatly facilitates replacement of worn pins and bushings and makes it possible to interchange different sizes of pins and bushings utilizing the same pair of plates or shoes. This greatly reduces the inventory and storage requirements of the manufacturer and large scale users of such die sets.

Having thus described this invention, what I claim:

1. In a die set; a die-supporting plate formed with a planar working surface and a cylindrical wall bore extending through said plate and having an axis disposed generally perpendicular to the planar working surface of said plate; an annular, internally threaded sleeve nonrotatively secured in radially compressed condition in the bore of said plate; a generally cylindrical guide member projecting outwardly from the planar surface of said plate and having an externally threaded end portion threadedly and detachably engaged with said sleeve; and means on said guide member engaging the planar working surface of said plate for positioning the axis of said guide member in exacting perpendicular relation to the planar working surface of said plate.

2. A die set according to claim 1, wherein said guide member comprises a tubular bushing, and said means comprises a radial shoulder of larger diameter than the bore of said plate and formed externally on said bushing intermediate the ends thereof and disposed in abutting engagement with the planar surface of said plate in the area thereof adjacent said bore.

3. A die set according to claim 1, wherein the threads of said sleeve and said guide member have blunt crests.